United States Patent [19]
Shimoda et al.

[11] Patent Number: 5,812,505
[45] Date of Patent: Sep. 22, 1998

[54] INFORMATION READING SYSTEM WITH CONTROLLED OPTICAL ACCESS

[75] Inventors: Yasuhisa Shimoda; Hiroyuki Kurashina, both of Saitama-ken, Japan

[73] Assignee: Pioneer Electronic Corporation, Tokyo, Japan

[21] Appl. No.: 754,802

[22] Filed: Nov. 21, 1996

[30] Foreign Application Priority Data

Nov. 22, 1995 [JP] Japan ..................................... 7-328302

[51] Int. Cl.$^6$ ........................................................ G11B 7/08
[52] U.S. Cl. ..................................... 369/44.35; 369/44.29; 369/44.41
[58] Field of Search ................................ 369/44.37, 44.38, 369/44.41, 44.42, 44.26, 54, 44.29, 44.35, 44.34

[56] References Cited

U.S. PATENT DOCUMENTS

| | | | |
|---|---|---|---|
| 4,866,688 | 9/1989 | Ohtake et al. | 369/44.28 |
| 5,138,592 | 8/1992 | Fujita | 369/44.13 |
| 5,412,630 | 5/1995 | Deguchi et al. | 369/44.37 |

FOREIGN PATENT DOCUMENTS 0165736  7/1987  Japan .

*Primary Examiner*—Thang V. Tran
*Attorney, Agent, or Firm*—Nikaido, Marmelstein, Murray & Oram LLP

[57] ABSTRACT

There is provided an improved information reading system, comprising: an objective lens for converging a reading beam on an information recording medium so as to form an information detecting point; an actuator for controlling the position of the information detecting point by driving the objective lens; a tracking error signal generator for generating a tracking error signal; a least one light detecting/receiving means having at least two light detecting/receiving sections for detecting and receiving light reflected from the information recording medium; a least one calculator connected with the at least one light detecting/receiving means for producing a difference signal indicating a difference between two light receiving amounts on the two detecting/receiving sections; a low frequency signal detecting/passing means for detecting and passing low frequency signals which are low frequency components contained in the difference signal; an adder for adding together the low frequency signals fed from the low frequency signal detecting/passing means and the tracking error signal; and a driver for driving the actuator in accordance with an output signal fed from the adder.

7 Claims, 6 Drawing Sheets

FIG.5 a
FIG.5 b
PRIOR ART
PRIOR ART
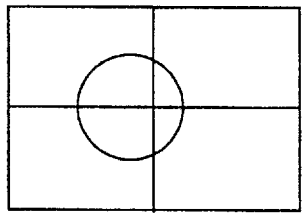
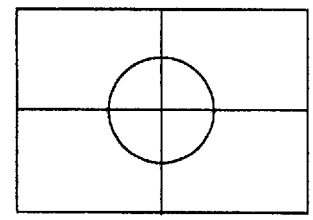

INFORMATION READING SYSTEM WITH CONTROLLED OPTICAL ACCESS

BACKGROUND OF THE INVENTION

The present invention relates to an information reading system, particularly to an information reading system having a controller for controlling an actuator which is provided to properly move an information reading point of an optical pickup on an information recording medium such as an optical disc.

As is well known, in a conventional information reading system for optically reading information recorded on an optical disc, a laser beam from a laser beam source is converged through an objective lens so that an information reading point is formed on an optical disc. Then, a light reflected from the optical di sc is received so that it is possible to read information recorded on the recording medium, also to perform focusing control and tracking control on an actuator.

FIG. 3 shows an optical tracking servo circuit using a DPP (Differential Push-pull) method, which circuit is incorporated in a conventional information reading system. In practice, a main beam is directed to an optical disc to read information therefrom and to obtain focus error signal. Meanwhile, tow sub-beams are also directed to the same optical disc to obtain tracking error signal. Then, reflected lights (reflected from disc surface) of the main beam and the sub-beams are detected and received respectively by a main detector 1 and two sub-detectors 2, 3. In detail, a reflected light of the main beam is detected and received by the main detector 1 having light receiving sections a, b, c, and d. At the same time, one reflected light of one sub-beam is detected and received by a sub-detector 2 having light receiving sections e and f, whilst the other reflected light of the other sub-beam is detected and received by a sub-detector 3 having light receiving sections g and h.

The tracking servo circuit shown in FIG. 3 includes a tracking error signal generating circuit. Such tracking error signal generating circuit comprises: a first subtractor 4 provided to receive output signals from the light receiving sections e and f of the sub-detector 2 and to subtract one output signal (from the light receiving section f) from the other output signal (from the light receiving section e) so as to produce a first difference signal; a second subtractor 5 provided to receive output signals from the light receiving sections g and h of the sub-detector 3 and to subtract one output signal (from the light receiving section h) from the other output signal (from the light receiving section g) so as to produce a second difference signal; a calculator 6 provided to receive output signals from the light receiving sections a, b, c and d of the main detector 1 and to perform a calculation of (a sum of signals from the right receiving sections a and b)–(a sum of signals from the left receiving sections c and d) so as to produce a calculation result signal; an adder 7 for adding together the first difference signal (from the first subtractor 4) and the second difference signal (from the second subtract 5) so as to produce an added signal; a multiplier 8 for multiplying the added signal (from the adder 7) with a predetermined constant K so as to produce a multiplied signal: a third subtractor 9 for subtracting the multiplied signal from the above calculation result signal so as to produce a tracking error signal.

Here, the value of the constant K of the multiplier 8 would be set in accordance with light amounts detected and received by the main detector 1 and sub-detectors 2 and 3.

The tracking error signal produced by the third subtractor 9 is used to indicate a deviation of an information detecting point (a spot position of the main beam on an optical disc) from an information track. Such a tracking error signal is fed from the third subtractor 9 to a driver 13 which in turn produces an output signal to drive an actuator 14 so as to perform a desired tracking control.

However, as shown in FIG. 4, if a CD-R disc (called CD-Recorder that is a recordable disc) is used as an information recording medium, such a CD-R will have a plurality of pregrooves formed on one surface of the disc for recording information, and such pregrooves will have a waviness having a central frequency of 22.05 KHz. Usually, ATIP (Absolute Time In Pregroove) information is recorded on the disc by FM-modulating the central frequency of the waviness.

On the other hand, the ATIP information can be read out by extracting an envelope signal enclosing a difference signal of [(a sum of signals from the right receiving sections a and b)–(a sum of signals from the left receiving sections c and d)] produced by the calculator 6.

Usually, a detector such as the main detector 1 should be appropriately adjusted such that a vertical dividing line of the main detector I will be coincident with an optical axis of a reflected light of the main beam, as shown in FIG. 5b. However, due to a possible adjustment error or a possible temperature change, the optical axis of the reflected light will shift from a condition shown in FIG. 5b to a condition shown in FIG. 5a indicating a deviation of the optical axis from the vertical dividing line. If ATIP information is to be read out from a CD-R (having information pits formed thereon) under the condition shown in FIG. 5a, RF signal from the information pits will be undesirably mixed into the ATIP information. As a result, the reading of the ATIP information will become difficult.

In detail, when the optical axis of a reflected light is deviated from the vertical dividing line on the main detector 1, a difference signal produced by the calculator 6 will be interfered and like that shown in FIG. 6a. Such a difference signal shown in FIG. 6a contains RF signals from information pits, which has a higher frequency than that of ATIP information. On the other hand, when the optical axis of a reflected light is coincident with the vertical dividing line on the main detector 1, the RF signal will not be mixed into the difference signal, thus obtaining an uninterfered difference signal as shown in FIG. 6b.

If the RF signal from the information pits is contained in a difference signal produced by the calculator 6, the RF signal will become a noise interfering ATIP information. As a result, the RF signal will be mixed into the ATIP information, hence there is a possibility that the ATIP information may not be correctly read out.

SUMMARY OF THE INVENTION

In view of the above problems existing in the above-mentioned prior art, it is an object of the present invention to provide an improved information reading system capable of controlling an actuator so that an optical axis of a reflected light from an information recording medium will be kept coincident with a dividing line of a light detector.

According to a first aspect of the present invention, there is provided an improved information reading system, comprising: an objective lens for converging a reading beam on an information recording medium so as to form an information detecting point; an actuator for controlling the position of the information detecting point by driving the objective lens; a tracking error signal generator for generating a tracking error signal which indicates a deviation of the information detecting point with respect to a desired information track on the information recording medium; a least one light detecting/receiving means having at least two light detecting/receiving sections for detecting and receiving light reflected from the information recording medium; a least one calculator connected with the at least one light detecting/receiving means for producing a difference signal indicating a difference between two light receiving amounts on the two detecting/receiving sections; a low frequency signal detecting/passing means for detecting and passing low frequency signals which are low frequency components contained in the difference signal; an adder for adding together the low frequency signals fed from the low frequency signal detecting/passing means and the tracking error signal; and a driver for driving the actuator in accordance with an output signal fed from the adder.

The information reading system according to the first aspect of the present invention may also include a controller provided to selectively apply the low frequency signal to the adder. Here, the controller is provided so as to selectively apply the low frequency signal to the adder, in accordance with the kind of a signal to be read from the information recording medium. Further, the controller is provided to apply the low frequency signal to the adder only when the information recording medium is a CD-R disc and when a signal to be read therefrom is ATIP information.

Moreover, the information reading system according to the first aspect of the present invention may include a further adder provided before the low frequency signal detecting/passing means, for adding together a plurality of difference signals from a plurality of calculators connected with a plurality of light detecting/receiving means, and for feeding an added signal to the low frequency signal detecting/passing means.

According to a second aspect of the present invention, there is provided another improved information reading system, comprising: an objective lens for converging a reading beam on an information recording medium so as to form an information detecting point; an actuator for controlling the position of the information detecting point by driving the objective lens; a tracking error signal generator for generating a tracking error signal which indicates a deviation of the information detecting point with respect to a desired information track on the information recording medium; a least one light detecting/receiving means having at least two light detecting/receiving sections for detecting and receiving light reflected from the information recording medium; a least one calculator connected with the at least one light detecting/receiving means for producing a difference signal indicating a difference between two light receiving amounts on the two detecting/receiving sections; a low frequency signal detecting/passing means for detecting and passing low frequency signals which are low frequency components contained in the difference signal; an adder for adding together the low frequency signals fed from the low frequency signal detecting/passing means and the tracking error signal; a driver for driving the actuator in accordance with an output signal fed from the adder; a controller provided to selectively apply the low frequency signal to the adder; a discriminating means for determining the kind of an information recording medium to be reproduced. Here, the controller is provided so as to selectively apply the low frequency signal to the adder, in accordance with a discriminating result indicating the kind of an information recording medium to be reproduced.

In detail, the above controller is provided to apply the low frequency signal to the adder when the discriminating means determines that an information recording medium is a CD-R disc, but not to apply the low frequency signal to the adder when the discriminating means determines that an information recording medium is a CD disc.

Moreover, the information reading system according to the second aspect of the present invention may include a further adder provided before the low frequency signal detecting/passing means, for adding together a plurality of difference signals from a plurality of calculators connected with a plurality of light detecting/receiving means, and for feeding an added signal to the low frequency signal detecting/passing means.

The above objects and features of the present invention will become more understood from the following description with reference to the accompanying drawings.

BRIEF DESCRIPTION OF DRAWINGS

FIG. 5a is a schematic explanatory view showing a deviation of an optical axis of a reflected light from a dividing line on a main light detector.

FIG. 5b is a schematic explanatory view showing a coincidence of an optical axis of a reflected light with a dividing line on a main light detector.

DETAILED DESCRIPTION OF THE PREFERRED EMBODIMENTS

Figure 1:
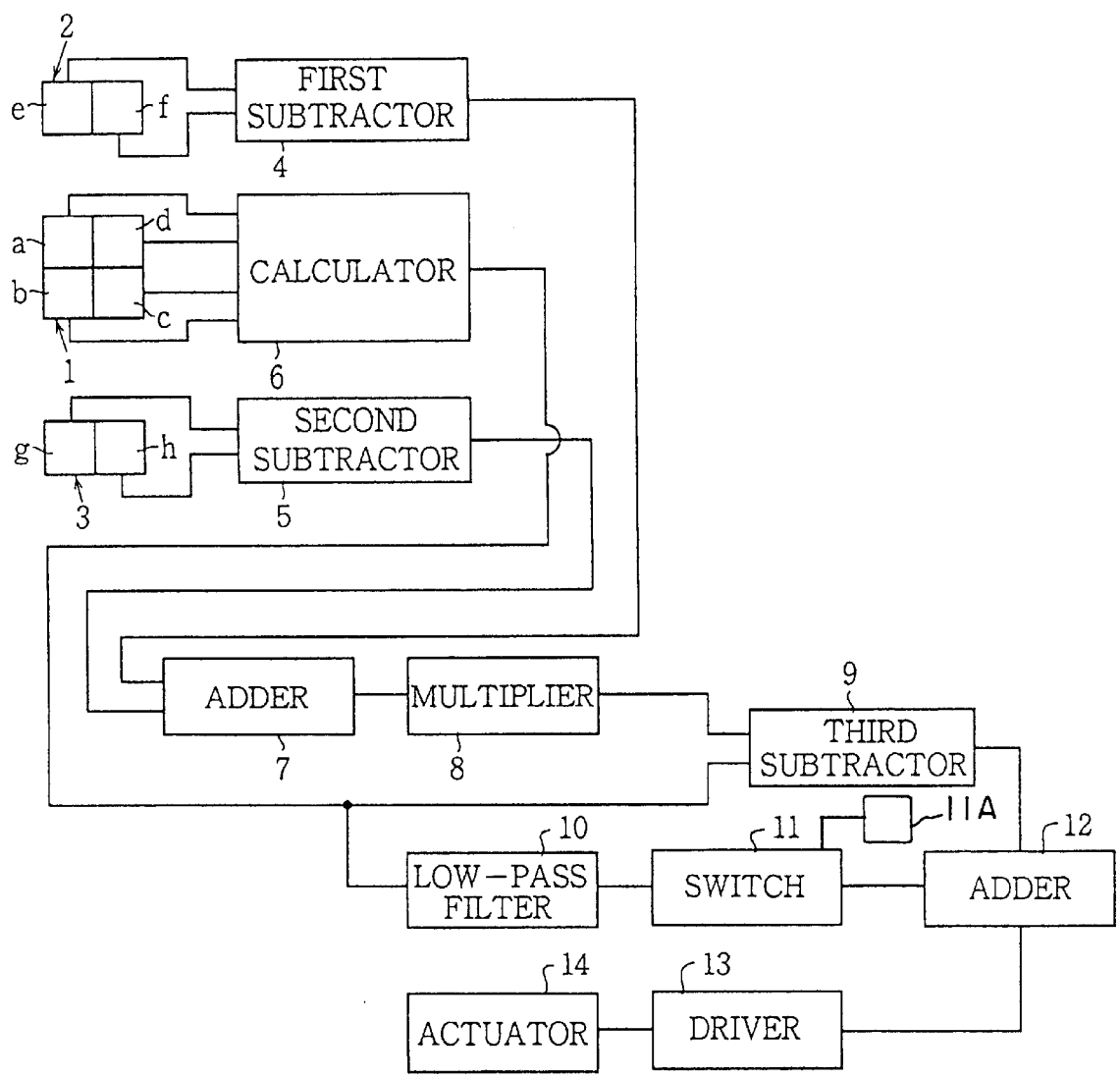
FIG. 1 is a block diagram showing an embodiment of the present invention, which is an improved tracking servo circuit for use in an information reading system.

The preferred embodiments of the present invention will be described in detail below with reference to FIGS. 1 and 2, in which identical elements as those in FIG. 3 will be represented by the same reference numerals, and the same explanation thereof will be omitted.

FIG. 1 is a block diagram showing an embodiment of the present invention, which is an improved tracking servo circuit for use in an information reading system. As shown in FIG. 1, the tracking servo circuit of the present invention is similar to the above-discussed conventional tracking servo circuit, except that the tracking servo circuit of the present invention further includes a low-pass filter 10, a switch 11 and an adder 12.

The low-pass filter 10, which serves to act as a low frequency signal detecting/passing means, is provided to receive the calculation result signal from the calculator 6 and to output low frequency components initially contained in the calculation result signal. In detail, a cut-off frequency of the low-pass filter 10 may be set such that it is possible to cut off a signal component representing a rotation deviation of an optical disc and having a high frequency, and that a light axis deviation signal of a low frequency may be extracted therefrom to indicate a deviation of the optical axis of a reflected light from a vertical dividing line on the detector 1. For instance, if the information reading system is a usual CD-R player, the cut-off frequency of the low-pass filter 10 may be set at about 1 KHz.

The switch 11 is provided to be controlled by a controller (not shown) so as to selectively apply an output signal from the low-pass filter 10 to the adder 12.

The adder 12 is provided to add together the output signal from the low-pass filter 10 and a tracking error signal from the third subtractor 9.

The operation of the tracking servo circuit according to the present invention will be described in detail below with reference to FIG. 1.

When a CD or a CD-R is to be reproduced, the tracking servo circuit as shown in FIG. 1 is turned on. At this time, the calculating result signal from the calculator 6 will contain relatively high frequency signals in a frequency band of 5–10 KHz and low frequency signals which are almost direct current components. The relatively high frequency signals in a frequency band 5–10 KHz will contain a signal component representing a rotation deviation of an optical disc, whilst the low frequency signals which are almost direct current components will contain a signal representing a deviation of an optical axis.

When such calculating result signal is passed through the low-pass filter 10, signal components having frequencies higher than that of the disc rotation deviation signal will be cut off, only permitting the passing of the signal representing a deviation of an optical axis.

The optical axis deviation signal is then selectively fed through the switch 11 to the adder 12, so as to be added to the tracking error signal from the third subtractor 9, thereby producing an added signal through the adder 12. The added signal is fed from the adder 12 to the driver 13 which in turn produces an output signal to drive the actuator 14 to perform a desired tracking control, so that a deviation of the optical axis of a reflected light from the vertical dividing line on the main detector 1 may be reduced to zero.

Here, the switch 11 is controlled by a controller (not shown) in a manner such that the switch 11 is closed only when there will be a problem caused by a deviation of the optical axis of a reflected light from the vertical dividing line on the main detector 1. For instance, the switch 11 is controlled to be closed when it is necessary to read ATIP information recorded on an optical disc during reproduction of a unfinalized CD-R (a recordable disc having no TOC information recorded thereon). On the other hand, if a finalized CD-R (a recordable disc having TOC information recorded thereon, and also having information pits representing main information formed thereon) is to be reproduced without a need for reproducing ATIP information, the switch 11 is controlled by the same controller so as to be opened. At this moment, since only normal tracking servo control is needed, the actuator 14 is controlled only by a tracking error signal from the third subtractor 9.

Although in the above embodiment it has been described that an optical axis deviation signal is selectively added to the tracking error signal depending upon the kind of an information to be read out, it is also possible that an optical axis deviation signal may be selectively added to the tracking error signal in accordance with a discriminating result of a recording medium discriminating means (not shown) provided to identify the kind of an information recording medium. For instance, when reproducing a CD-R, since it is usually necessary that the ATIP information should be reproduced, the controller will operate such that an optical axis deviation signal may be fed to the adder 12. On the other hand, when reproducing a CD not containing ATIP information, the controller will not operate to cause an optical axis deviation signal to be fed to the adder 12.

Further, although in the above embodiment, a DPP method is used in the tracking error detection, it is also possible to employ other methods such as a three-beam method or a phase-differential method.

Moreover, although in the above embodiment, merely the tracking error signal is used to control the actuator 14, but if a Knife-edge method is used to detect focus error at the same time, an optical axis deviation on a detector for detecting focus error will cause an offset in a focus error signal, thus the actuator 14 may be controlled such that during the reproduction of a CD, the optical axis deviation signal from the focus error detector is added to the tracking error signal, so as to prohibit an optical axis deviation from a vertical dividing line on the main detector 1.

Figure 2:
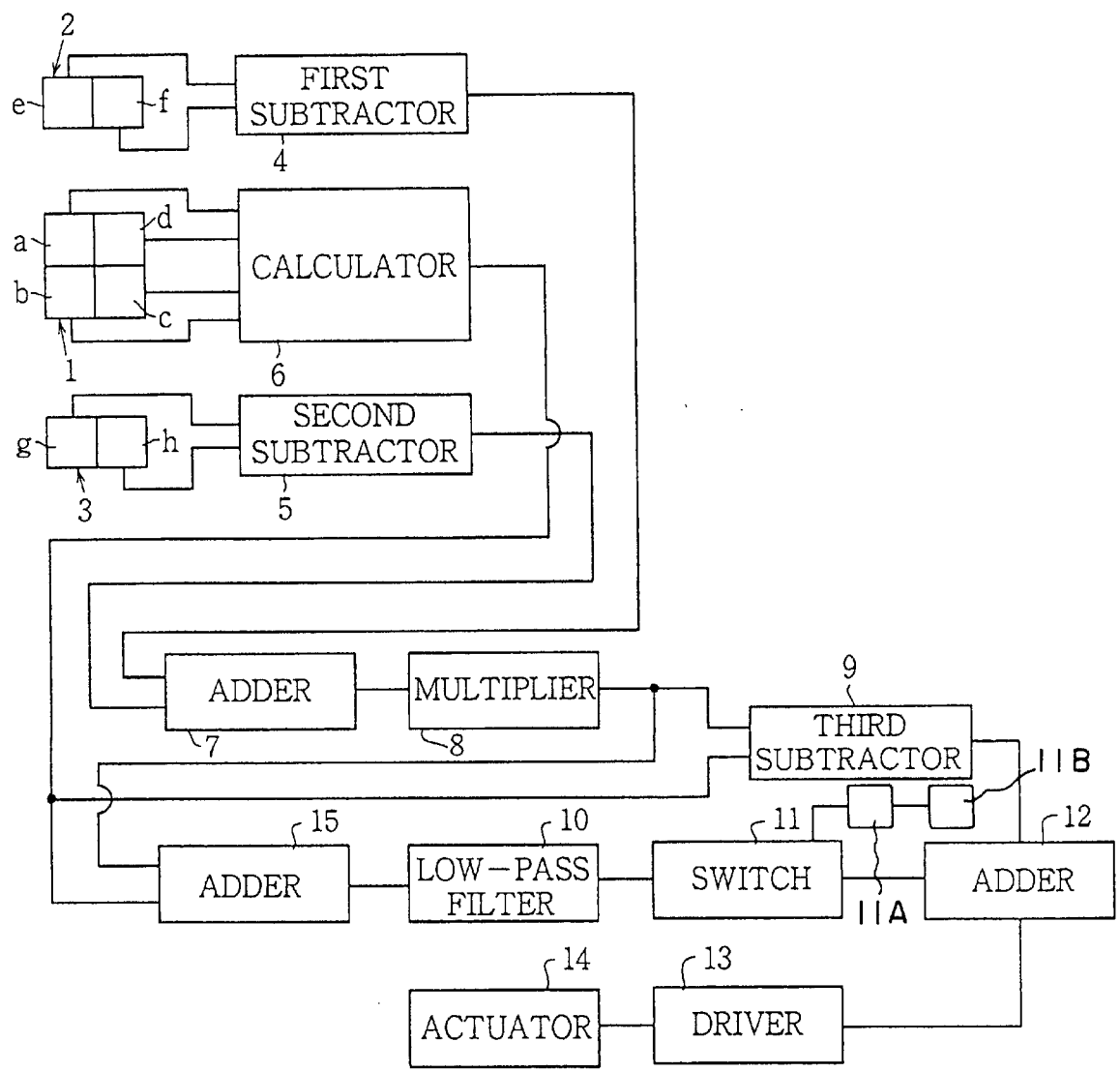
FIG. 2 is a block diagram showing another embodiment of the present invention, which is another improved tracking servo circuit for use in an information reading system.
Figure 3:
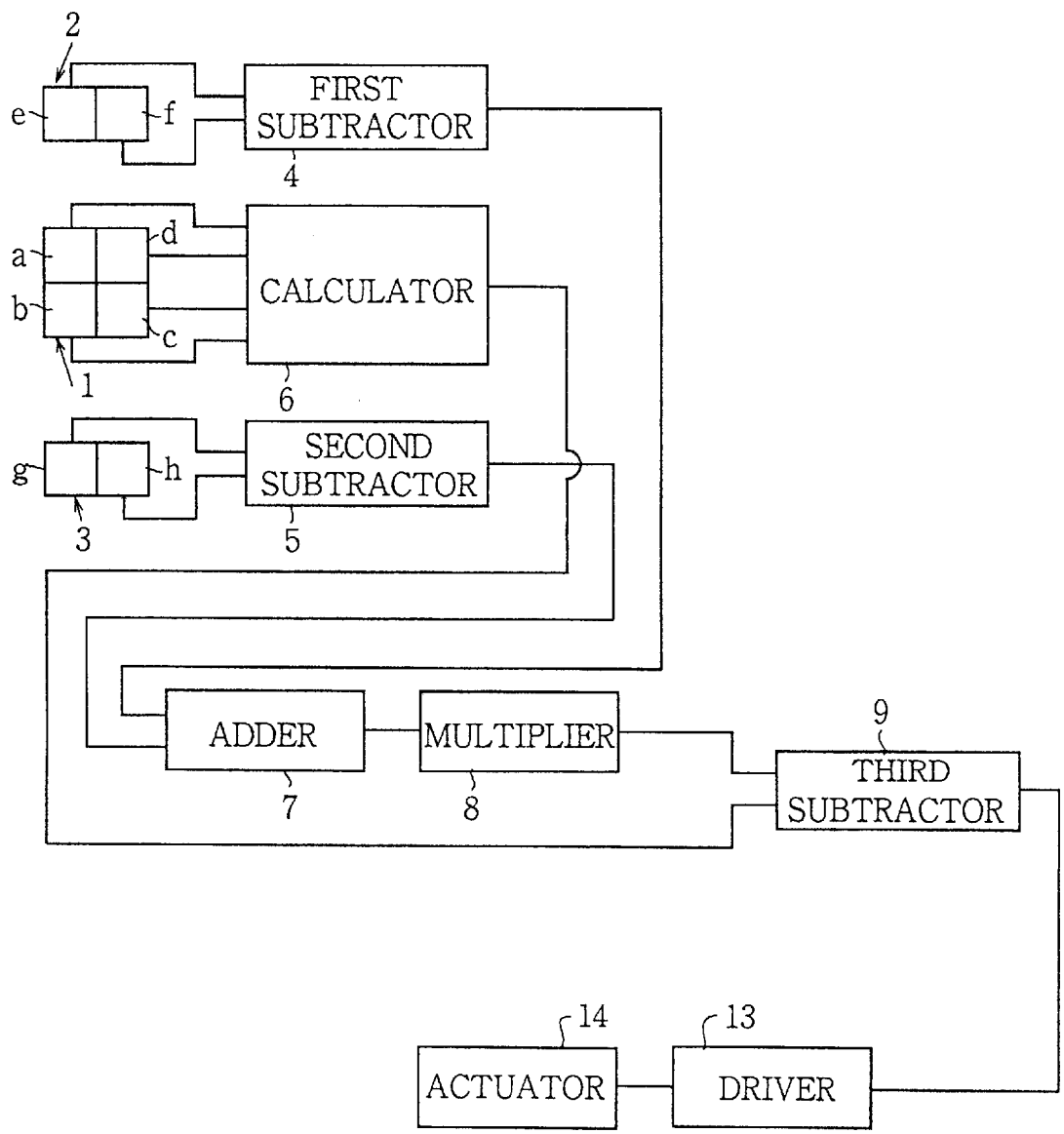
FIG. 3 is a block diagram showing a conventional tracking servo circuit for use in a conventional information reading system.
Figure 4:
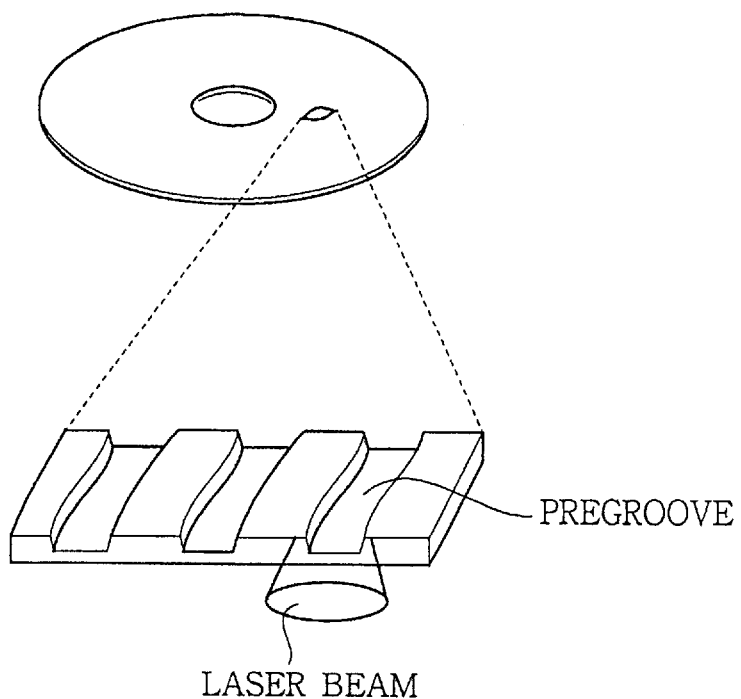
FIG. 4 is a schematic explanatory view showing a structure of a CD-R disc.
Figure 6:
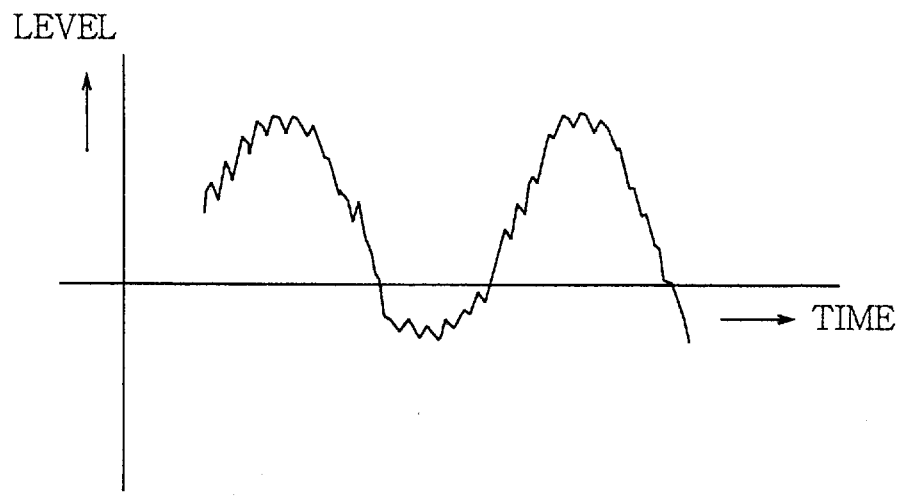
FIG. 6a is a graph showing a difference signal produced by a calculator connected with the main light detector when there is a deviation between an optical axis of a reflected light and a dividing line on the main light detector.
FIG. 6b is a graph showing a difference signal produced by a calculator connected with the main light detector when an optical axis of a reflected light is coincident with a dividing line on the main light detector.
Figure 6:
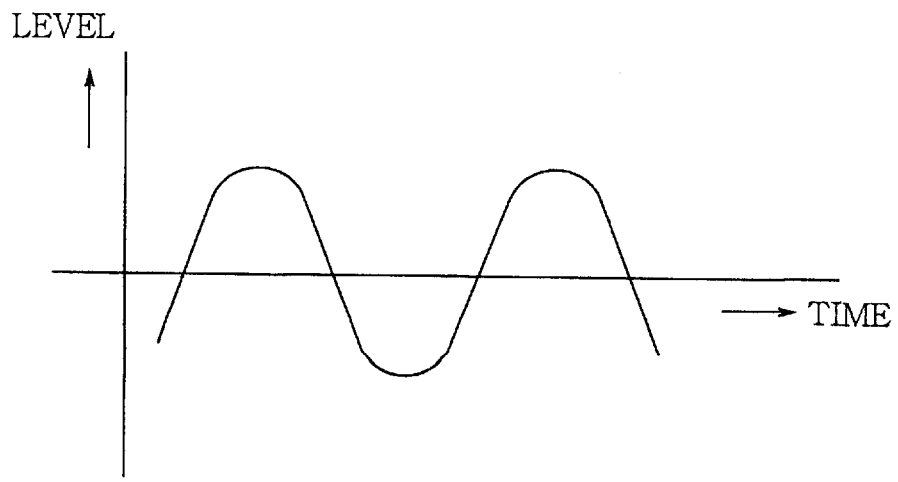

FIG. 2 is a block diagram showing another embodiment of the present invention, which is another improved tracking servo circuit for use in an information reading system.

The tracking servo circuit shown in FIG. 2 is almost the same as the tracking servo circuit shown in FIG. 1, except that the tracking servo circuit shown in FIG. 2 includes a further adder 15. As shown in FIG. 2, the adder 15 is provided to receive and add together the calculation signal from the calculator 6 and the output signal from the multiplier 8. An added signal is fed from the adder 15 to the low-pass filter 10.

Since the output signal from the multiplier 8 also contains low frequency components including optical axis deviation signal, the added signal including the calculation signal from the calculator 6 and the output signal from the multiplier 8, upon being fed to the low-pass filter 10, will produce an optical axis deviation signal having a higher level than that of the optical axis deviation signal (extracted only from the calculation signal fed from the calculator 6) produced from the low-pass filter 11 in the tracking servo circuit shown in FIG. 1.

On the other hand, it is also possible not to use the main detector 1, but to use only the two sub-detectors 2 and 3 to produce optical axis deviation signal to perform the desired control on the actuator 14.

As can be realized from the above description, with the use of the information reading system according to the present invention, it has become possible to control an actuator so that an optical axis of a reflected light from an information recording medium will be kept coincident all the time with a vertical dividing line of a light detector, thus enabling the system not only to generate tracking error signal for normal tracking control, but also to read out other information such as ATIP information without any noise.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. An information reading system, comprising:

an objective lens for converging a reading beam on an information recording medium so as to form an information detecting point;

an actuator for controlling the position of the information detecting point by driving the objective lens;

a tracking error signal generator for generating a tracking error signal which indicates a deviation of the information detecting point with respect to a desired information track on the information recording medium;

a least one light detecting/receiving means having at least two light detecting/receiving sections for detecting and receiving light reflected from the information recording medium;

a least one calculator connected with the at least one light detecting/receiving means for producing a difference signal indicating a difference between two light receiving amounts on the two detecting/receiving sections;

a low frequency signal detecting/passing means for detecting and passing low frequency signals which are low frequency components contained in the difference signal;

an adder for adding together the low frequency signals fed from the low frequency signal detecting/passing means and the tracking error signal; and a driver for driving the actuator in accordance with an output signal fed from the adder.

2. An information reading system, comprising:

an objective lens for converging a reading beam on an information recording medium so as to form an information detecting point;

an actuator for controlling the position of the information detecting point by driving the objective lens;

a tracking error signal generator for generating a tracking error signal which indicates a deviation of the information detecting point with respect to a desired information track on the information recording medium;

at least one light detecting/receiving means having at least two light detecting/receiving sections for detecting and receiving light reflected from the information recording medium;

at least one calculator connected with the at least one light detecting/receiving means for producing a difference signal indicating a difference between two light receiving amounts on the two detecting/receiving sections;

a low frequency signal detecting/passing means for detecting and passing low frequency signals which are low frequency components contained in the difference signal;

an adder for adding together the low frequency signals fed from the low frequency signal detecting/passing means and the tracking error signal;

a driver for driving the actuator in accordance with an output signal fed from the adder; and a controller provided to selectively apply the low frequency signal to the adder;

wherein the controller is provided so as to selectively apply the low frequency signal to the adder, based upon information read from the information recording medium.

3. An information reading system according to claim 2, wherein the controller is provided to apply the low frequency signal to the adder only when the information recording medium is a CD-R disc and when the information read therefrom is ATIP information.

4. An information reading system according to claim 1 or 2, wherein a further adder is provided before the low frequency signal detecting/passing means, for adding together a plurality of difference signals from a plurality of calculators connected with a plurality of light detecting/receiving means, and for feeding an added signal to the low frequency signal detecting/passing means.

5. An information reading system, comprising:

an objective lens for converging a reading beam on an information recording medium so as to form an information detecting point;

an actuator for controlling the position of the information detecting point by driving the objective lens;

a tracking error signal generator for generating a tracking error signal which indicates a deviation of the information detecting point with respect to a desired information track on the information recording medium;

a least one light detecting/receiving means having at least two light detecting/receiving sections for detecting and receiving light reflected from the information recording medium;

a least one calculator connected with the at least one light detecting/receiving means for producing a difference signal indicating a difference between two light receiving amounts on the two detecting/receiving sections;

a low frequency signal detecting/passing means for detecting and passing low frequency signals which are low frequency components contained in the difference signal;

an adder for adding together the low frequency signals fed from the low frequency signal detecting/passing means and the tracking error signal;

a driver for driving the actuator in accordance with an output signal fed from the adder;

a controller provided to selectively apply the low frequency signal to the adder;

a discriminating means for determining the kind of an information recording medium to be reproduced;

wherein the controller is provided so as to selectively apply the low frequency signal to the adder, in accordance with a discriminating result indicating the kind of an information recording medium to be reproduced.

6. An information reading system according to claim 5, wherein said controller is provided to apply the low frequency signal to the adder when the discriminating means determines that an information recording medium is a CD-R disc, but not to apply the low frequency signal to the adder when the discriminating means determines that an information recording medium is a CD disc.

7. An information reading system according to claim 5, wherein a further adder is provided before the low frequency signal detecting/passing means, for adding together a plurality of difference signals from a plurality of calculators connected with a plurality of light detecting/receiving means, and for feeding an added signal to the low frequency signal detecting/passing means.

* * * * *